United States Patent
Li

(10) Patent No.: US 7,518,731 B2
(45) Date of Patent: Apr. 14, 2009

(54) INTERFEROMETRIC MOEMS SENSOR

(76) Inventor: Chian Chiu Li, 1847 Bristol Bay CMN, San Jose, CA (US) 95131-3802

( * ) Notice: Subject to any disclaimer, the term of this patent is extended or adjusted under 35 U.S.C. 154(b) by 284 days.

(21) Appl. No.: 11/307,319

(22) Filed: Feb. 1, 2006

(65) Prior Publication Data

US 2006/0192974 A1 Aug. 31, 2006

Related U.S. Application Data

(60) Provisional application No. 60/648,423, filed on Feb. 1, 2005, provisional application No. 60/766,579, filed on Jan. 30, 2006.

(51) Int. Cl.
*G01B 9/02* (2006.01)
(52) U.S. Cl. ...................................... 356/482
(58) Field of Classification Search ................. 356/482, 356/496, 505, 506, 519
See application file for complete search history.

(56) References Cited

U.S. PATENT DOCUMENTS

| | | | | |
|---|---|---|---|---|
| 4,263,810 A | * | 4/1981 | Chiu | 73/800 |
| 4,286,879 A | * | 9/1981 | Jager et al. | 356/496 |
| 4,744,661 A | * | 5/1988 | Ulbers et al. | 356/482 |
| 4,942,767 A | * | 7/1990 | Haritonidis et al. | 356/482 |
| 5,206,702 A | * | 4/1993 | Kato et al. | 356/493 |
| 5,301,010 A | * | 4/1994 | Jones et al. | 356/479 |
| 5,381,231 A | * | 1/1995 | Tu | 356/482 |
| 5,396,328 A | * | 3/1995 | Jestel et al. | 356/482 |
| 5,420,688 A | * | 5/1995 | Farah | 356/482 |
| 5,450,195 A | * | 9/1995 | Dammann et al. | 356/482 |
| 5,541,730 A | * | 7/1996 | Chaney | 356/482 |
| 5,559,358 A | * | 9/1996 | Burns et al. | 257/431 |
| 6,178,284 B1 | * | 1/2001 | Bergmann et al. | 385/140 |
| 6,473,187 B1 | | 10/2002 | Manalis | |
| 6,718,821 B1 | * | 4/2004 | Houston et al. | 356/482 |
| 6,763,718 B1 | | 7/2004 | Waters et al. | |
| 2004/0130728 A1 | * | 7/2004 | Degertekin et al. | 356/505 |
| 2005/0237617 A1 | | 10/2005 | Carr et al. | |

* cited by examiner

*Primary Examiner*—Samuel A Turner

(57) ABSTRACT

The present invention relates to an optical interferometric apparatus and method for measuring acceleration, pressure, and pressure of fluids during flow using micro-opto-electro-mechanical-systems (MOEMS). The high-sensitivity and high-resolution apparatus includes a movable mass, a stationary mass, a light source, and a photo detector. The light source emits a beam which is converted into two beam portions after impinging onto the movable and stationary masses. Interference between the beam portions are used to measure acceleration or pressure. The MOEMS structure may be integrated with a photo detector or planar waveguide. Differential amplification can be realized by employing two similar detecting structures.

20 Claims, 14 Drawing Sheets

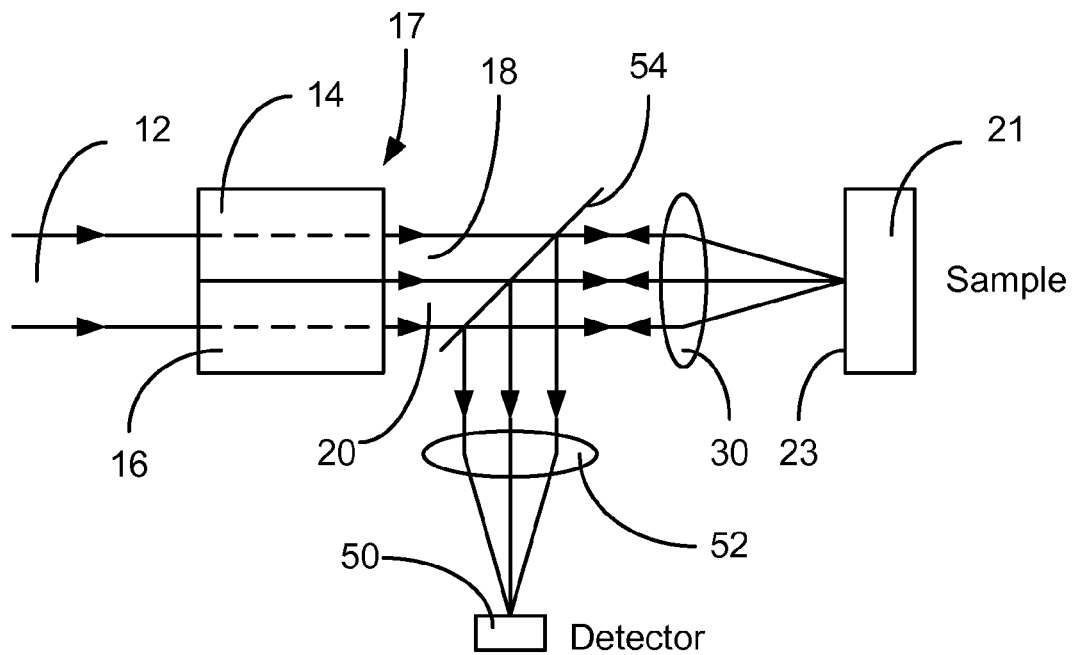
FIG. 1-A (Prior Art)
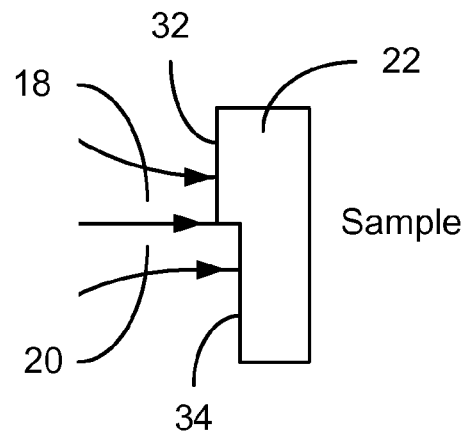
FIG. 1-B (Prior Art)

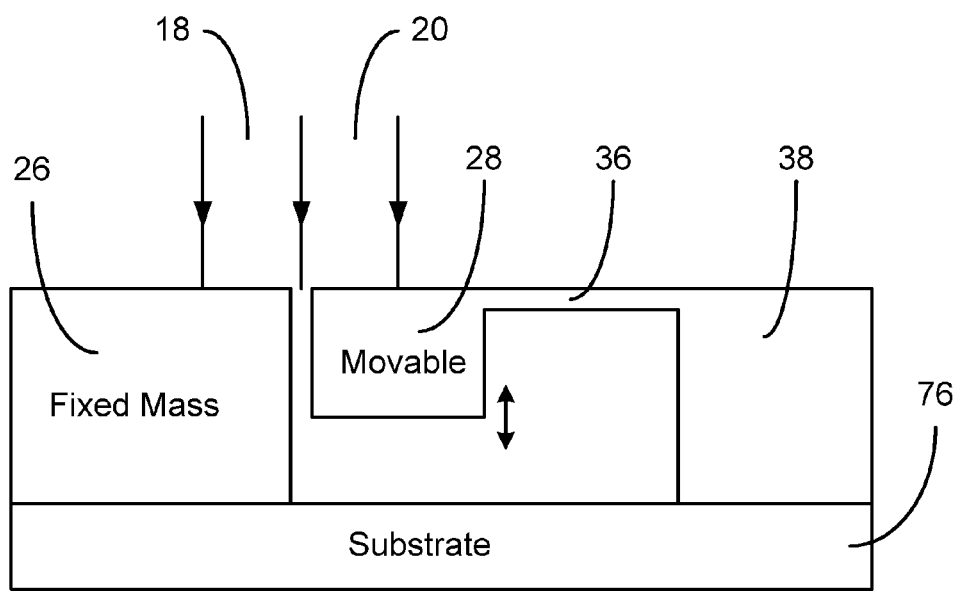
FIG. 2
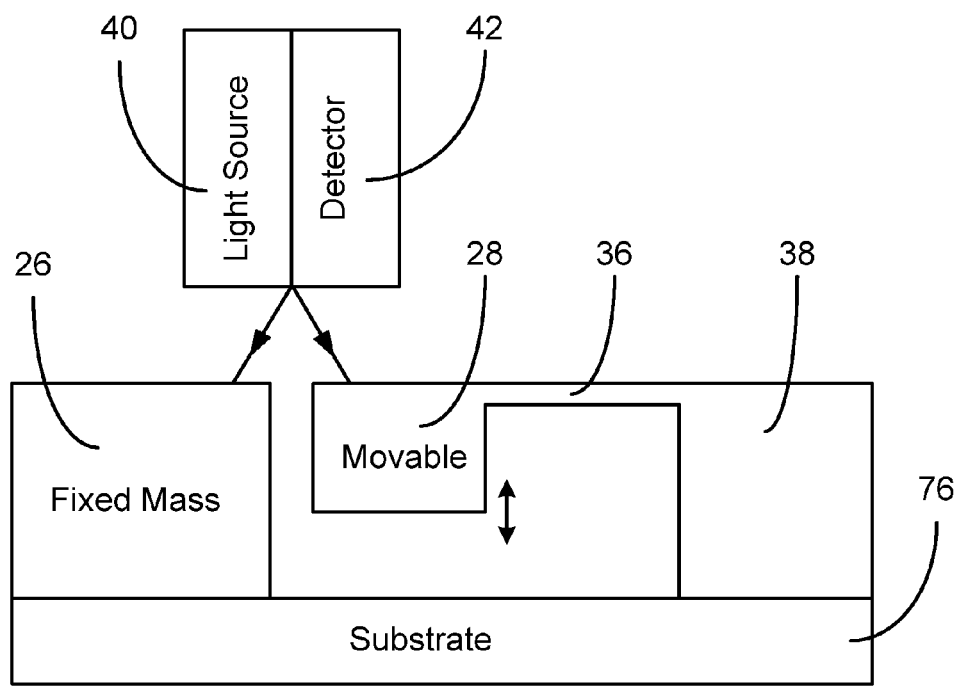
FIG. 3-A

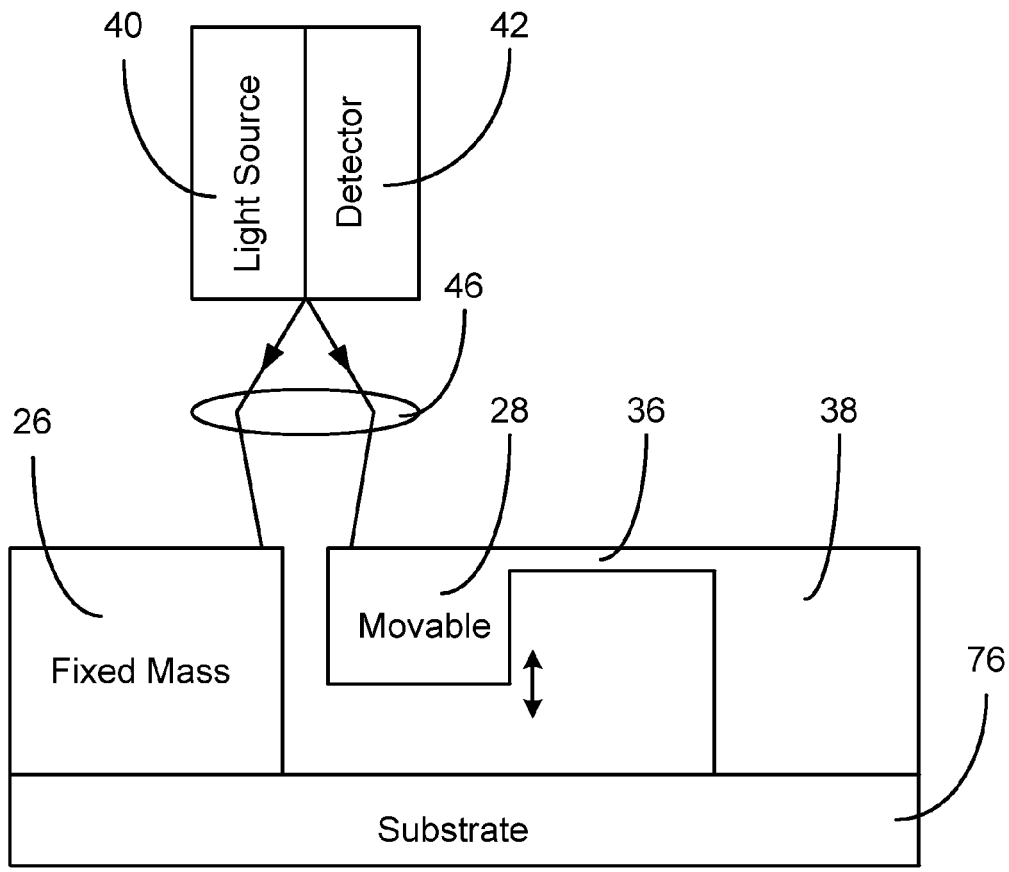
FIG. 3-B
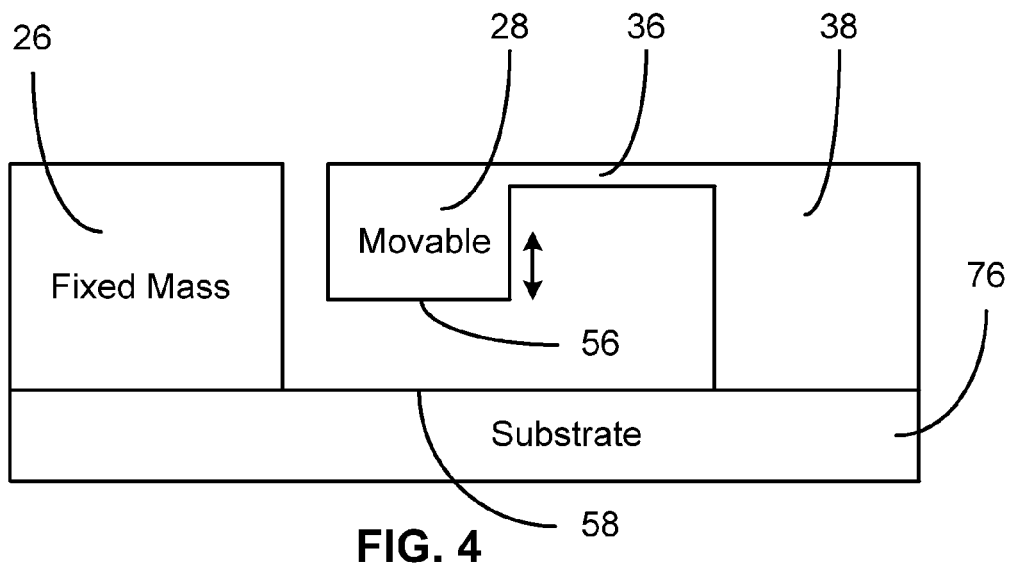
FIG. 4

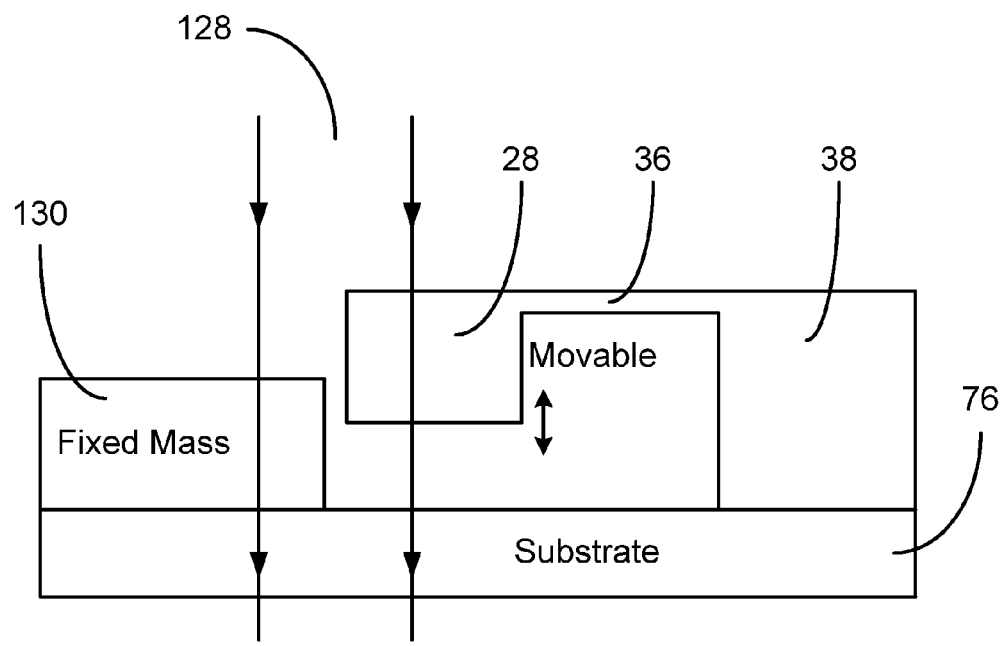
FIG. 11
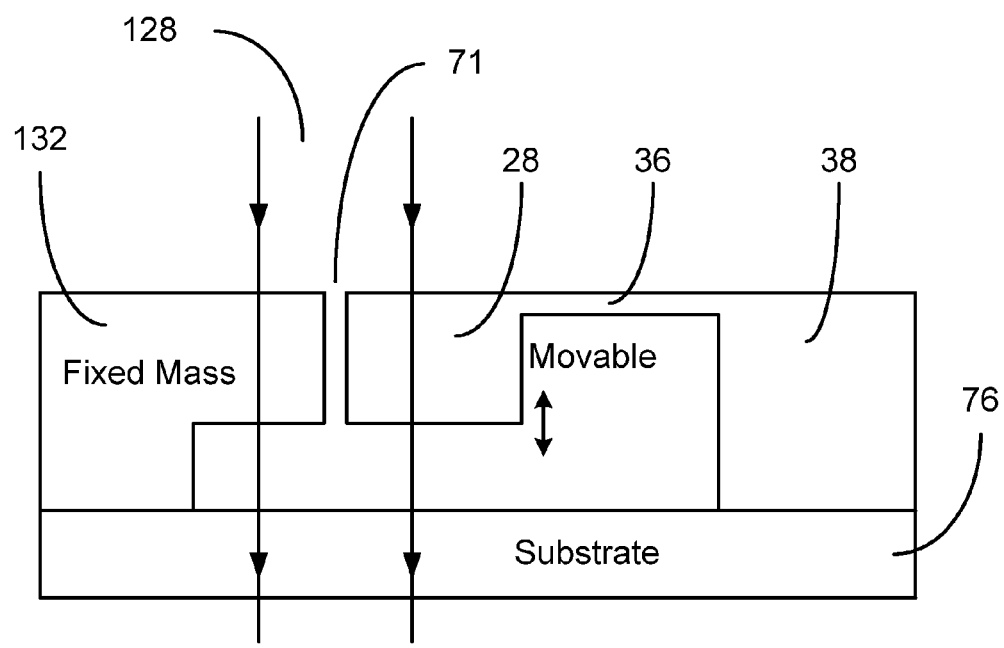
FIG. 12-A

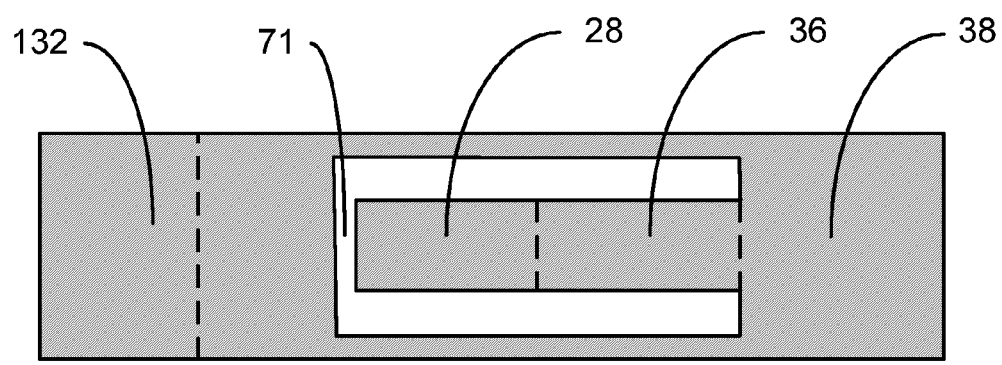
FIG. 12-B
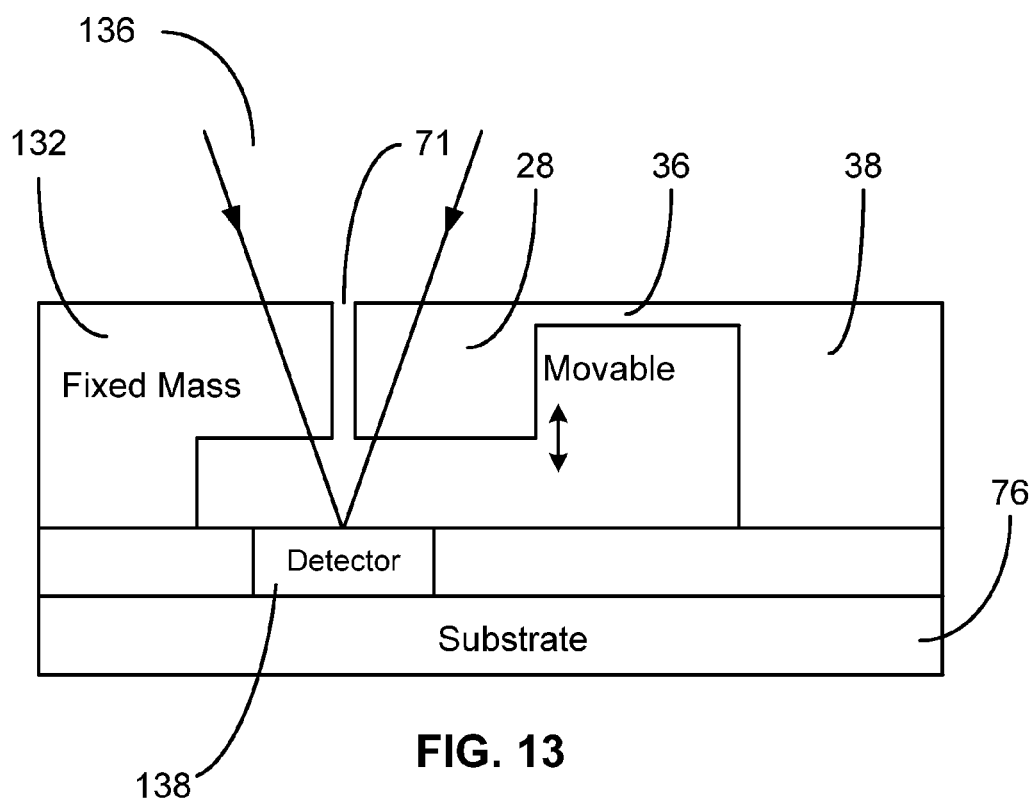
FIG. 13

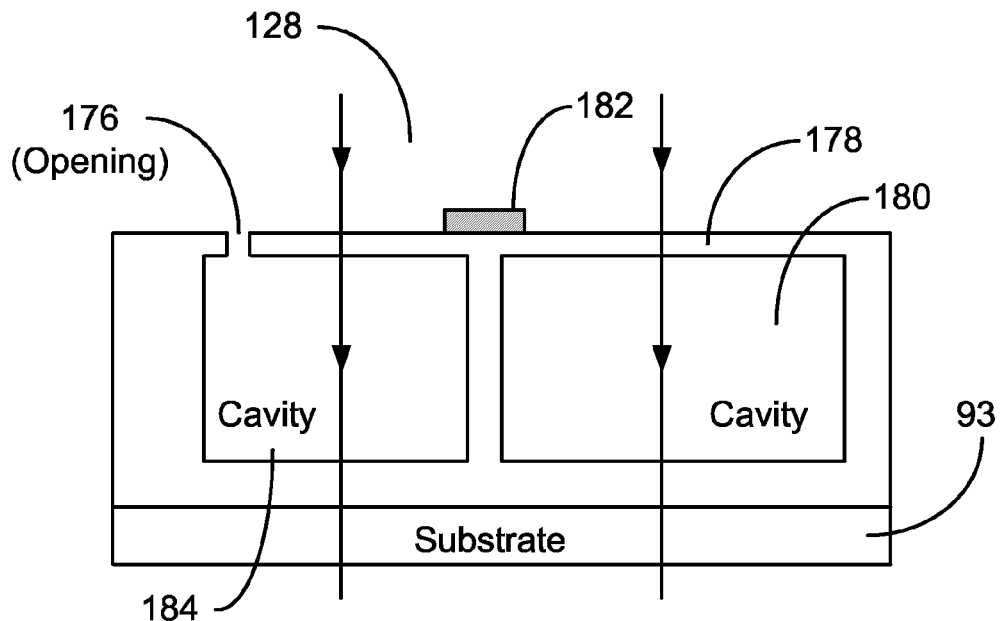
FIG. 14
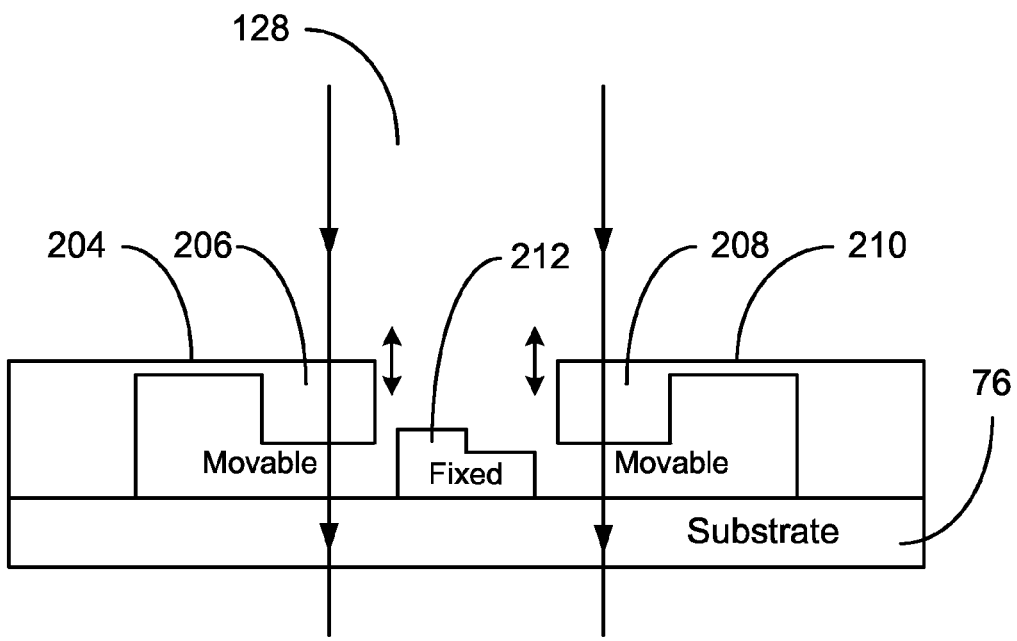
FIG. 15-A

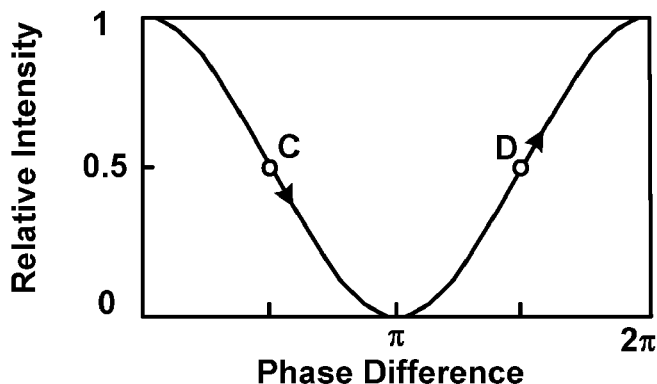
FIG. 15-B
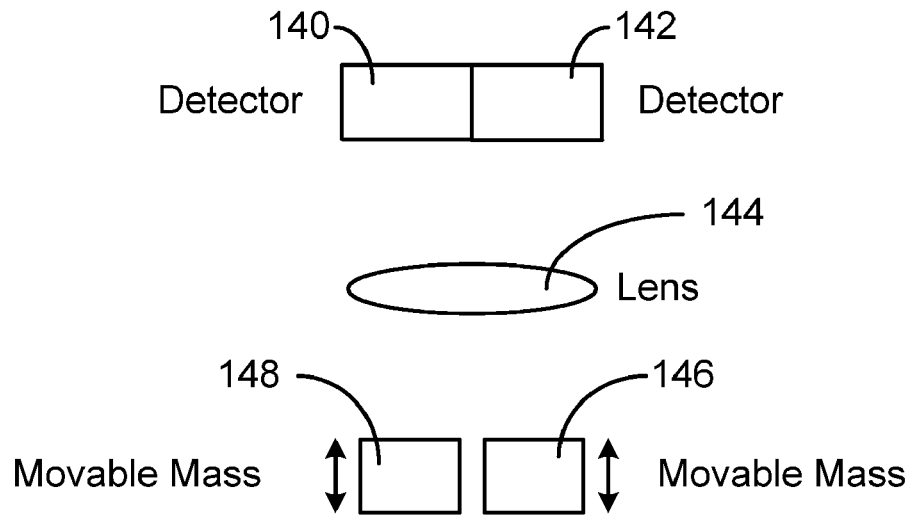
FIG. 16-A
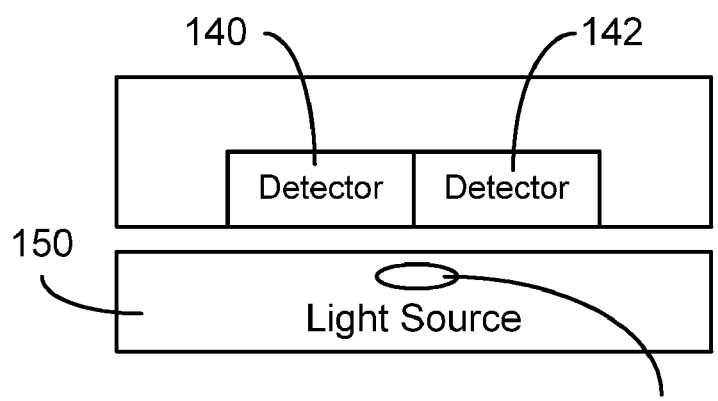
FIG. 16-B

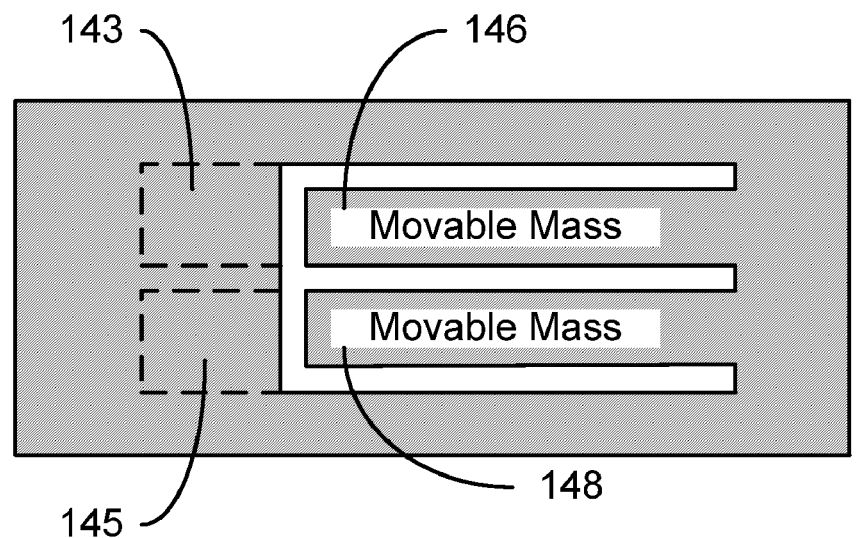
FIG. 16-C
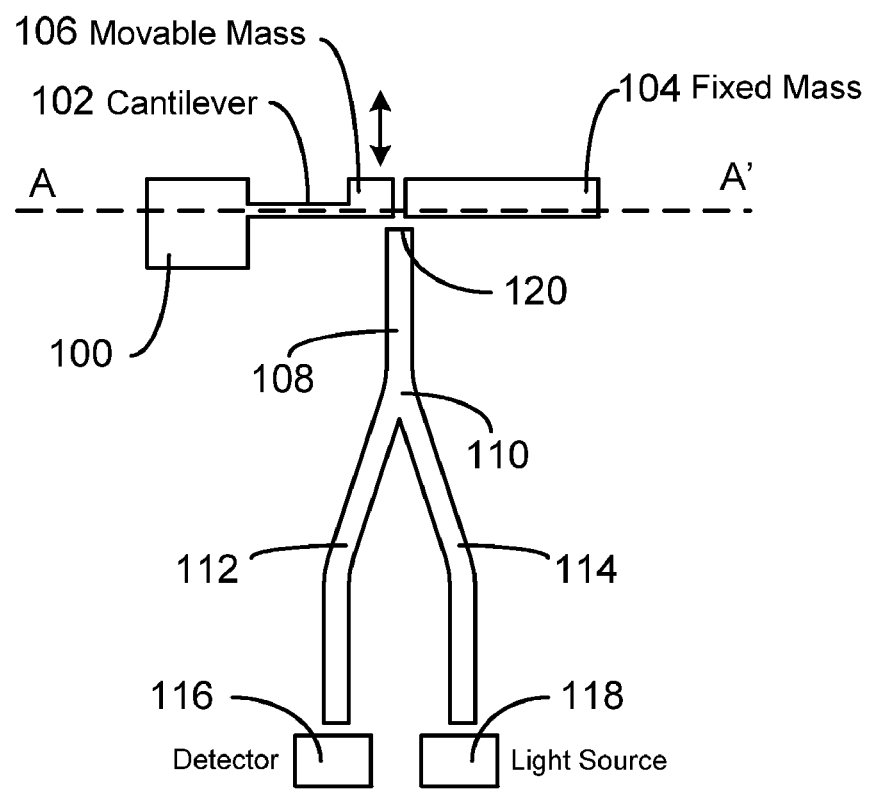
FIG. 17-A

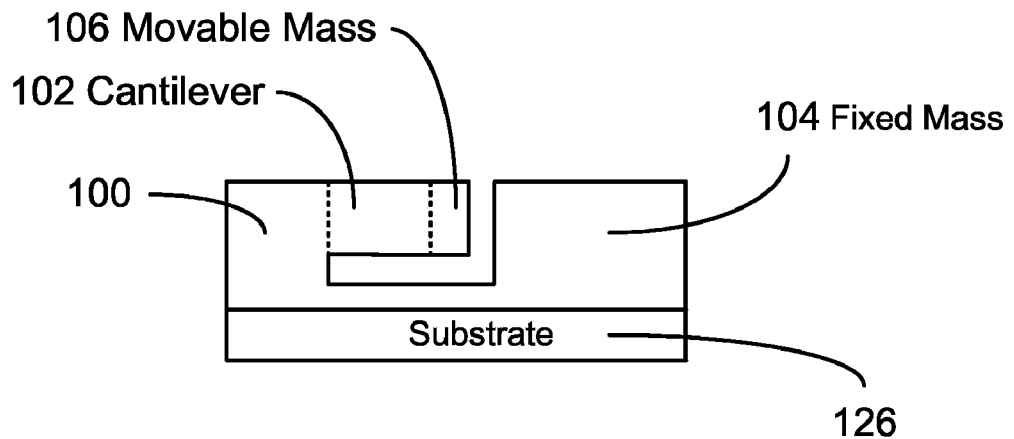
FIG. 17-B
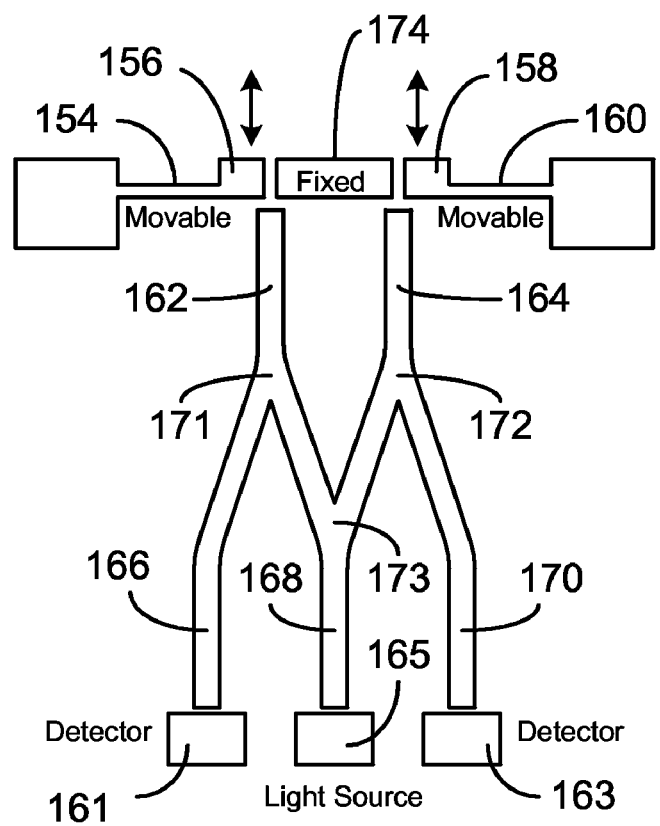
FIG. 18

INTERFEROMETRIC MOEMS SENSOR

CROSS REFERENCE TO RELATED APPLICATION

This application is entitled to the benefit of Provisional Patent Application Ser. No. 60/648,423, filed Feb. 1, 2005 and Ser. No. 60/766,579, filed Jan. 30, 2006.

FEDERALLY SPONSORED RESEARCH

Not applicable

SEQUENCE LISTING OR PROGRAM

Not applicable

BACKGROUND

1. Field of Invention

This invention relates to optical interferometric sensors, particularly to interferometric MOEMS accelerometers and pressure sensors.

2. Description of Prior Art

High-sensitivity and high-resolution accelerometers have applications in seismology and navigation. They are also used in monitoring systems of structure condition. In the applications, low cost and small size of an accelerometer are often required besides sensitivity and resolution. Among currently available methods for acceleration detection, e.g. capacitative, piezoresistive, piezoelectric, tunneling, and optical interferometric schemes, the optical interferometric scheme has an advantage over the others in terms of specification and cost when it is combined with micro-electro-mechanical-systems (MEMS). When MEMS is blended with optics, it is often call optical MEMS or micro-opto-electro-mechanical-systems (MOEMS).

In U.S. Pat. No. 6,473,187 to Manalis, a MOEMS accelerometer is disclosed in which an interferometer consists of micromachined interdigital fingers and one set of the fingers moves when it is subject to acceleration. In U.S. Pat. No. 6,763,718 to Waters et al., another type of MOEMS accelerometer is taught where an adjustable Fabry-Perot interferometer is fabricated and used for the measurement. In the prior art, however, the interdigital fingers or Fabry-Perot cavity mean a complex structure, which adds to manufacturing difficulties and restricts reduction of size.

Accordingly, there is a need for a high-sensitivity and high-resolution MOEMS accelerometer which is smaller in size and easier to make compared to the present ones.

A compact high-sensitivity pressure sensor is often made by attaching or forming a Fabry-Perot interferometer at the end of an optical fiber. Again, the Fabry-Perot cavity, having two well-aligned parallel reflectors, is difficult to fabricate. In addition, when one reflector moves due to change of pressure, characteristics of the interferometer are prone to deteriorate.

Therefore, there exists a need for a compact pressure sensor which is relatively easier to fabricate and has high-sensitivity.

OBJECTS AND ADVANTAGES

Accordingly, several main objects and advantages of the present invention are:

a) to provide an improved high-sensitivity and high-resolution MOEMS accelerometer;

b) to provide such an accelerometer which has a relatively simple and small structure and is relatively easy to manufacture;

c) to provide such an accelerometer which uses a light source, a stationary mass, a movable mass, and a photo detector to achieve high-sensitivity and high-resolution and a compact structure;

d) to provide an improved high-sensitivity MOEMS pressure sensor;

e) to provide such a sensor which has a relatively simple and small structure and is relatively easy to manufacture; and f) to provide such a sensor which employs a light source, a stationary mass, a movable membrane, and a photo detector to achieve high-sensitivity and a compact structure.

Further objects and advantages will become apparent from a consideration of the drawings and ensuing description.

SUMMARY

An interferometric MOEMS accelerometer contains a light source, a detector, a stationary mass, and a movable mass. The light source emits a beam which impinges onto the masses simultaneously. After interacting with the masses, the beam is converted into two beam portions having a phase difference. Since position of the movable mass is subject to acceleration, the phase difference is used to obtain acceleration through analyzing interference between the beam portions. Similar principles also apply to a MOEMS pressure sensor, where the movable mass is replaced by a membrane.

ABBREVIATIONS

MEMS Micro-electro-mechanical-systems
MOEMS Micro-opto-electro-mechanical-systems

BRIEF DESCRIPTION OF THE SEVERAL VIEWS OF THE DRAWINGS

FIGS. 1-A and 1-B are schematic cross-sectional views of a prior-art optical interferometric surface profiler.

FIGS. 2, 3-A, 3-B, and 4 to 9 are schematic cross-sectional views showing embodiments of several reflection-type MOEMS accelerometers.

FIGS. 11, 12-A, 12-B are schematic cross-sectional views and a top view showing embodiments of transmission-type MOEMS accelerometers.

FIG. 13 is a schematic cross-sectional view showing an embodiment of a MOEMS accelerometer integrated with a photo detector.

FIG. 14 is a schematic cross-sectional view of an embodiment of a transmission-type MOEMS pressure sensor.

FIGS. 15-A, 15-B, and 16-A to 16-C are schematic cross-sectional views, diagrams, and a top view showing embodiments of transmission-type MOEMS accelerometers which have capability of differential amplification.

FIGS. 17-A, 17-B, and 18 to 21 are schematic top and cross-sectional views showing embodiments of MOEMS accelerometers employing planar waveguides to transmit a beam.

Figure 5:
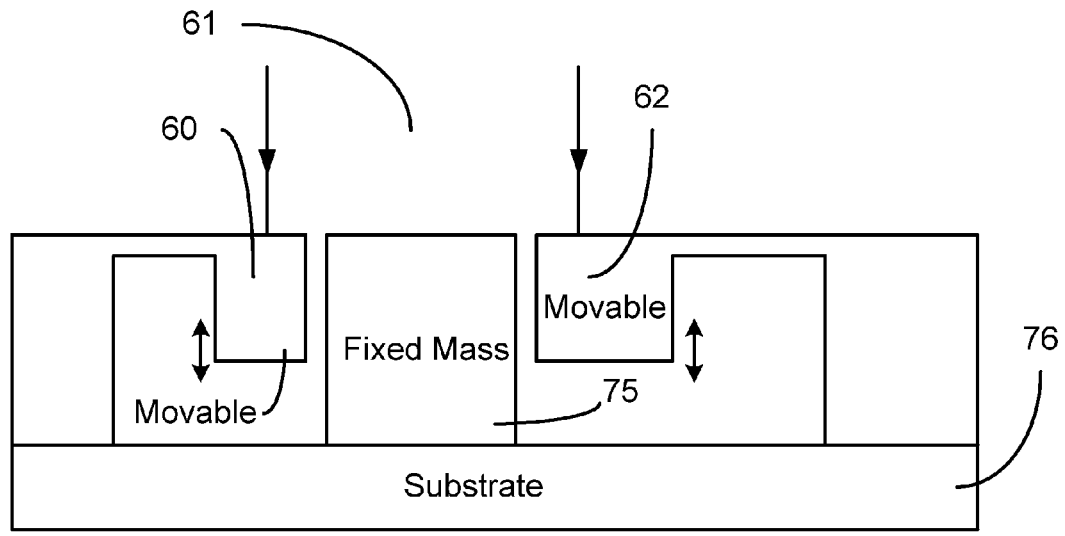

| REFERENCE NUMERALS IN DRAWINGS | | | |
|---|---|---|---|
| 12 | collimated beam | 14 | modulator element |
| 16 | modulator element | 17 | spatial phase modulator |
| 18 | beam portion | 20 | beam portion |
| 21 | sample | 22 | sample |
| 23 | sample surface | 26 | fixed mass |
| 28 | movable mass | 30 | lens system |
| 32 | sample surface | 34 | sample surface |
| 36 | cantilever | 38 | fixed end |
| 40 | light source | 42 | photo detector |
| 46 | lens system | 50 | photo detector |
| 52 | lens system | 54 | beam splitter |
| 56 | electrode surface | 58 | electrode surface |
| 60 | movable mass | 61 | beam |
| 62 | movable mass | 64 | phase tuning device |
| 66 | lens system | 68 | optical fiber |
| 70 | fiber optic coupler | 71 | gap |
| 72 | optical fiber | 74 | optical fiber |
| 75 | fixed mass | 76 | substrate |
| 80 | light source | 82 | photo detector |
| 88 | mass surface | 90 | mass surface |
| 92 | mass surface | 93 | substrate |
| 94 | mass surface | 96 | membrane |
| 97 | movable mass | 98 | cavity |
| 100 | fixed end | 102 | cantilever |
| 104 | fixed mass | 106 | movable mass |
| 108 | waveguide channel | 110 | beam splitter |
| 112 | waveguide channel | 114 | waveguide channel |
| 116 | detector | 118 | light source |
| 120 | waveguide end | 126 | substrate |
| 128 | beam | 130 | fixed mass |
| 132 | fixed mass | 136 | convergent beam |
| 138 | detector | 140 | detector |
| 142 | detector | 143 | fixed mass |
| 144 | lens system | 145 | fixed mass |
| 146 | movable mass | 148 | movable mass |
| 150 | light source | 152 | light emitting spot |
| 154 | cantilever | 156 | movable mass |
| 158 | movable mass | 160 | cantilever |
| 161 | photo detector | 162 | waveguide channel |
| 163 | photo detector | 164 | waveguide channel |
| 165 | light source | 166 | waveguide channel |
| 168 | waveguide channel | 170 | waveguide channel |
| 171 | beam splitter | 172 | beam splitter |
| 173 | beam splitter | 174 | fixed mass |
| 176 | opening | 178 | membrane |
| 180 | cavity | 182 | blocking element |
| 184 | cavity | 186 | movable mass |
| 188 | fixed mass | 190 | cantilever |
| 191 | waveguide channel | 192 | waveguide channel |
| 193 | waveguide channel | 194 | waveguide channel |
| 196 | beam splitter | 198 | accelerometer substructure |
| 200 | accelerometer substructure | 201 | beam splitter |
| 202 | beam splitter | 203 | beam splitter |
| 204 | cantilever | 206 | movable mass |
| 208 | movable mass | 210 | cantilever |
| 212 | fixed mass | 222 | fixed mass |
| 224 | cavity element | 226 | movable mass |
| 228 | cavity | 230 | cavity element |
| 232 | membrane | 306 | waveguide channel |
| 308 | waveguide channel | 310 | fixed mass |
| 312 | cantilever | 314 | fixed end |
| 316 | movable mass | | |

DETAILED DESCRIPTION

FIGS. 1-A and 1-B—Prior-Art

FIGS. 1-A and 1-B illustrate schematic cross-sectional views of a prior-art optical interferometric surface profiler. A collimated beam 12 is transmitted through regions 14 and 16 of a spatial phase modulator 17 and is divided into beam portions 18 and 20 by wavefront division. Next the beam portions are focused onto a surface 23 of a sample 21. The reflected beam from surface 23 is reflected by a beamsplitter 54 and focused onto a detector 50 by a focus lens 52.

FIG. 1-B shows a typical application of the device in FIG. 1-A. Beam portions 18 and 20 are focused onto a sample 22, where stepped surface areas 32 and 34 reflect the beam portions respectively. By tuning the phase difference between the two portions by modulator 17, the step height can be obtained. For example, the two portions can be tuned in or out of phase. Since how much the phase is tuned is known, the step height can be calculated.

FIG. 2—Embodiment of a MOEMS Accelerometer

FIG. 2 shows schematically a cross-sectional view of a reflection-type MOEMS accelerometer. Assume that beam portions 18 and 20 are focused onto a top surface of a fixed or stationary mass 26 and a top surface of a movable mass 28 respectively. Mass 28 is attached to a cantilever 36, and cantilever 36 to a fixed end 38. Mass 26 and end 38 are disposed on a substrate 76. All items in FIG. 2 can be made on a semiconductor wafer by mature MEMS technologies.

When there is acceleration along a direction perpendicular to mass 28's top surface, cantilever 36 is bent due to inertia on mass 28, where the displacement value is dependable on the acceleration. The bending causes a height difference change between top surfaces of masses 26 and 28. By the same principle of the surface profiler in FIGS. 1-A and 1-B, displacement of mass 28 can be obtained by tuning a spatial phase modulator. Having the displacement and the time in which the bending takes place, acceleration can be derived.

Since the interference method is able to achieve sub-Angstrom resolution, the accelerometer has much higher sensitivity and resolution than a MEMS accelerometer operated by electrical schemes.

The spatial phase modulator may use various methods to adjust phase difference between the two beam portions. Electro-optical methods employ materials like LiNbO$_3$ and liquid crystal. A mechanical method tunes phase delay mechanically.

FIGS. 3-A and 3-B—Embodiment of a Compact MOEMS Accelerometer

FIG. 3-A shows schematically a cross-sectional view of a compact reflection-type MOEMS accelerometer. A light source 40 and a detector 42 are designed and aligned such that source 40's light emitting spot is proximate to a light receiving area of detector 42. Source 40 and detector 42 are placed close to fixed mass 26 and movable mass 28. A beam from source 40 is transmitted to impinge onto the masses and is reflected back. The reflected beam contains two beam portions coming from top surfaces of masses 26 and 28 respectively. Because detector 42 is proximate to source 40, part of the reflected beam reaches the detector which detects interference between the portions. When acceleration is zero, there is an interference value caused by the initial optical path difference. In the presence of acceleration, the optical path difference changes, and so does the interference intensity detected by detector 42. The intensity change is used to calculate the acceleration.

When there is no acceleration, phase difference between the two portions may be arranged to have a value by presetting height difference between surfaces of masses 26 and 28. For example, the two portions may initially have a phase difference of pi/2, which makes it possible to utilize the most linear range of the well-known interference intensity vs. phase difference curve.

Compared to a Fabry-Perot cavity or interdigital fingers, the structure in FIG. 3-A is simpler and more compact, and is easier to make.

FIG. 3-B shows schematically another embodiment where a focus lens 46 is added to the set-up in FIG. 3-A. Without the focus lens, light source 40 and detector 42 have to be placed close to the masses' surfaces because the beam is divergent. Lens 46 focuses the beam onto top surfaces of masses 26 and 28. On the other hand, part of the reflected beam is focused onto the detector. Because of the focus lens, the light source and detector may be placed away from the masses and in the meantime the signal intensity is increased.

To reduce feedback on light source 40, a half wave plate may be used to rotate polarization such that a reflected beam has a polarization perpendicular to that of a beam from source 40.

FIG. 4—Embodiment of a Hybrid Accelerometer

As shown in a cross-sectional view in FIG. 4, an embodiment combines a traditional MEMS accelerometer with a MOEMS accelerometer by incorporating a capacitor structure in the schemes discussed. One electrode of the capacitor is with movable mass 28, while the other electrode is with the substrate 76. The capacitance is dependable upon distance between electrode surfaces 56 and 58 and it tells how much mass 28 is displaced. The capacitative method is complimentary to the interference method, since the former gives a relatively rough result, while the latter results in finer resolution. Without the former, the latter has a difficult time when the path length change due to mass 28's displacement is larger than half of the beam's wavelength.

The hybrid method may be used in all embodiments here. Other electrical methods can also be used.

FIG. 5—Embodiment Having Two Movable Masses

In a cross-sectional view in FIG. 5, there are two movable masses 60 and 62 along with a stationary mass 75. Here a beam 61 is divided into three beam portions by the masses and can be viewed as two MOEMS accelerometers share one stationary mass. Masses 60 and 62 have different inertia and cantilevers. The scheme may be used to improve dynamic range of measurement.

Figure 6:
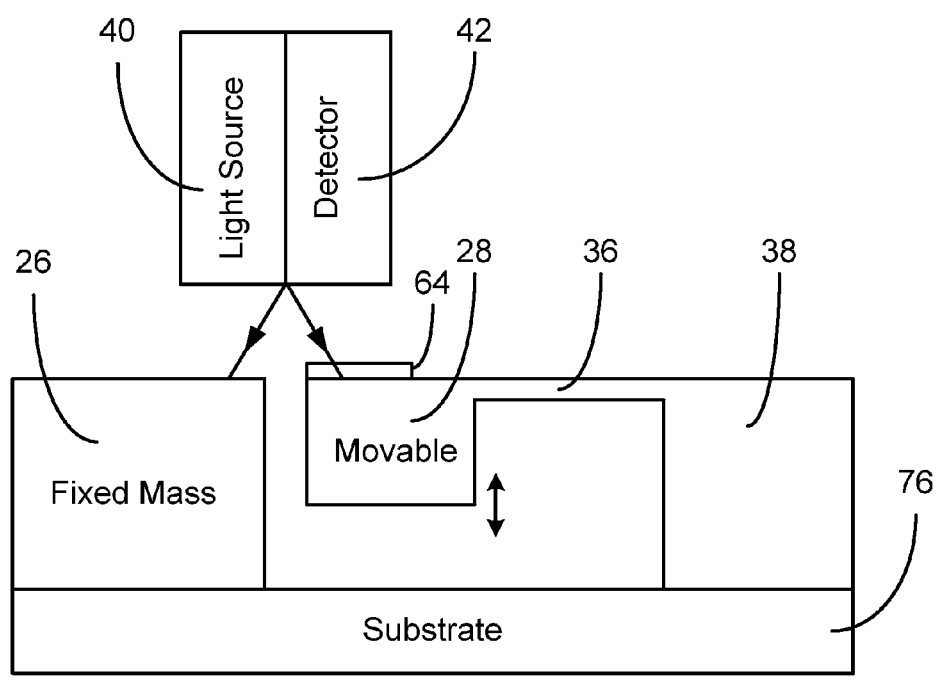

FIG. 6—Embodiment of an Improved Compact MOEMS Accelerometer

The embodiment in FIG. 6 improves a MOEMS accelerometer like the one in FIG. 3A. With reference to FIG. 6, a phase tuning device 64 is disposed on the surface of movable mass 28. Device 64 makes the interference tunable. Only light travels to and from mass 28 passes through device 64. If device 64 can't be tuned to compensate phase difference between the beam portions, at least it tells what position it is on an interference intensity vs. phase difference curve. For example, when interference intensity changes from a peak or valley, there are two possible positions due to a cosine curve. But the position can be resolved if a phase tuning is utilized, because once the phase difference is known, the curve slope can be calculated. Device 64 may also be a fixed phase element to adjust initial phase delay of the beam portion.

Figure 7:
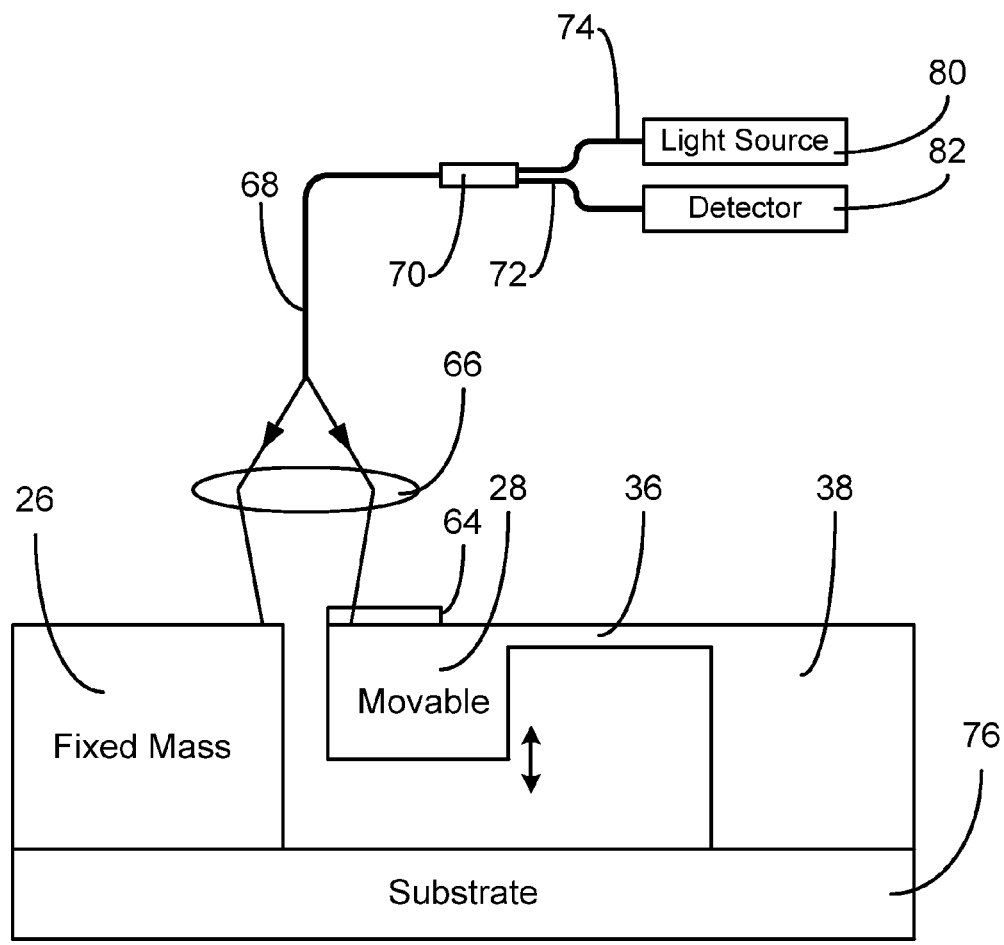

FIG. 7—Embodiment of a MOEMS Accelerometer Employing Optical Fibers

FIG. 7 shows a MOEMS accelerometer which replaces the light source and detector in FIG. 6 by a fiber optic setup. A beam from a light source 80 is coupled into an optical fiber 74. After passing through fiber 74, a fiber optic coupler 70, and another optical fiber 68, the beam is focused onto masses 26 and 28 by a lens system 66. The reflected beam is partially coupled back into fiber 68 by lens 66 and is transmitted to a detector 82 through fibers 68 and 72. The fiber optical coupler serves as beam splitter. Using the fiber optic arrangement, the light source and detector can be placed remotely, which is desirable in some applications.

Figure 8:
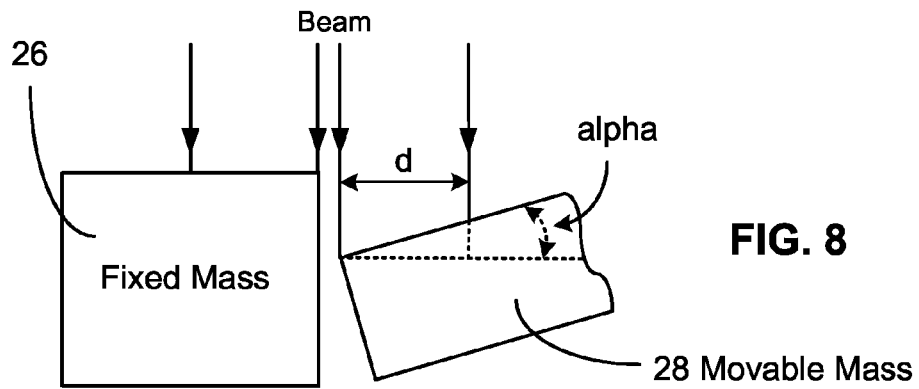
Figure 9:
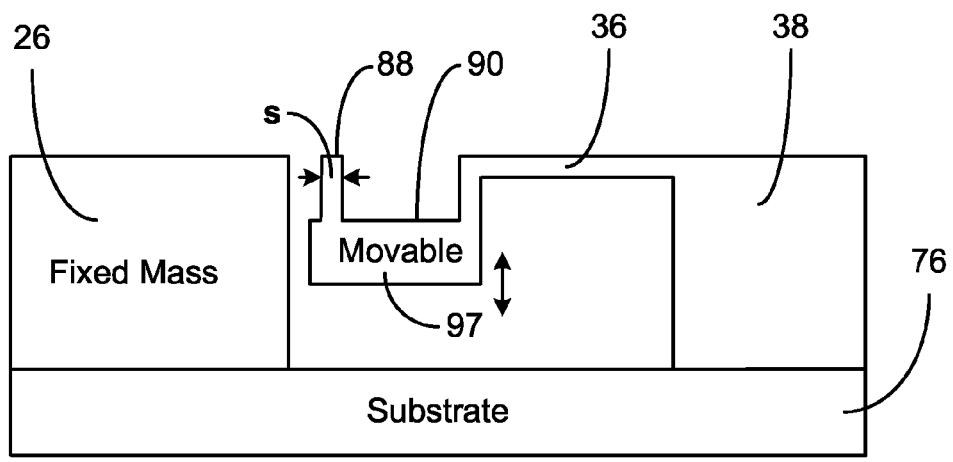

FIGS. 8 and 9—Embodiment of Improved MOEMS Accelerometer

In the presence of acceleration, movable mass 28 tilts, as shown schematically in a partial cross-sectional view in FIG. 8. The reflected beam actually contains multiple path lengths, which makes the interference result complicated. In FIG. 8, assuming the ambient refractive index is one, a beam portion has a dimension of d and the tilting angle is alpha, the maximum path length difference within the reflected beam portion is 2d*tan (alpha). Thus the smaller the d, the smaller the unwanted path length difference. There are two ways to minimize the effect caused by the tilt: to provide a small-size beam portion or a small-size effective surface area. In the latter case, the reflected light only comes from a small area, which equals to a small beam portion.

As illustrated graphically in a cross-sectional view in FIG. 9, a MOEMS accelerometer contains a movable mass 97 whose top surface is processed such that only a small surface area 88 contributes to reflection. Area 88 has a dimension s, much smaller than a recessed surface area 90. Area 90 is made to deflect or scatter a beam so that it won't reach the detector. Another way is to make surface 90 out of the focus region. Stationary mass 26 may also have a small reflective area to match intensity of the interfering beam portions.

Area 88 makes the interference between the beam portions close to two-wave rather than multi-wave interference. As a result, data processing is simplified and measurement sensitivity is improved.

Figure 10:
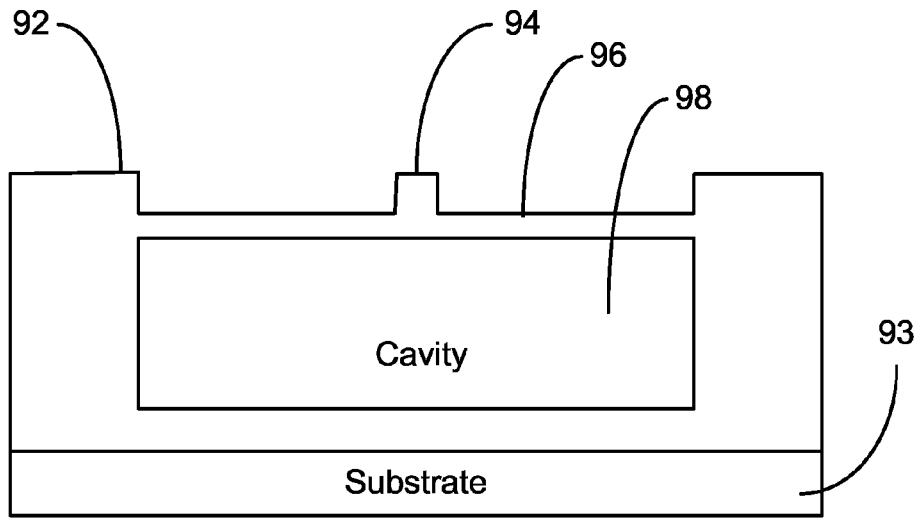
FIG. 10 is a schematic cross-sectional view of an embodiment of a reflection-type MOEMS pressure sensor.

FIG. 10—Embodiment of a MOEMS Pressure Sensor

FIG. 10 shows schematically a cross-sectional view of a reflection-type interferometric MOEMS pressure sensor. A cavity 98 on a substrate 93 is sealed by a membrane 96. When pressure changes, membrane 96 moves up or down accordingly, so does a small surface area 94 that is disposed on the membrane. Interference between light reflected from surface 94 and 92 results in displacement of the membrane, which is used to calculate the pressure outside of cavity 98.

Thanks to the similar principles, all the schemes used in the reflection-type MOEMS accelerometers can be utilized to make a MOEMS pressure sensor.

FIGS. 11, 12-A, and 12-B—Embodiments of MOEMS Accelarometer

FIG. 11 shows schematically a cross-sectional view of a transmission-type MOEMS accelerometer. A collimated beam 128 from a light source (not shown) impinges onto movable mass 28 and a stationary mass 130 simultaneously. Mass 28 is attached to cantilever 36, which is attached to fixed end 38. Mass 130 and end 38 are disposed on substrate 76.

After beam 128 interacts with masses 28 and 130, it becomes two beam portions, whose phase is delayed by the masses respectively. Next the two beam portions pass through substrate 76 and are focused onto a detector (the focus lens and detector not shown). The detector senses interference caused by the beam portions. The interference intensity is depended upon their phase difference.

When there is acceleration along a direction perpendicular to mass 28's top surface, cantilever 36 is bent due to inertia of mass 28. The bending makes mass 28 tilt, which in turn increases phase delay of the corresponding beam portion. Thus the bending can be detected by measuring interference intensity of the beam portions. A spatial phase modulator may also be added to adjust phase difference between the two beam portions. As a result of phase tuning, the measurement resolution is improved, since the phase difference can be tuned to any value.

FIG. 12-A illustrates schematically a cross-sectional view of another transmission-type MOEMS accelerometer. This accelerometer is similar to the embodiment in FIG. 11, except structure of the fixed mass. In FIG. 12-A, a stationary mass 132 has a cavity below its top surface like movable mass 28. But mass 132 has three supported sides, as shown in a top view in FIG. 12-B, and only one side of it, which is adjacent to a gap 71, is suspended. The three fixed sides make mass 132 stationary. Because mass 132 and 28 share the same layer, it has merits in ease of phase delay control.

FIG. 13—Embodiment of an Integrated MOEMS Accelerometer

FIG. 13 shows schematically a cross-sectional view of an integrated MOEMS accelerometer. The transmission-type embodiment contains fixed mass 132, movable mass 28, and an integrated photo detector 138 on substrate 76. A convergent beam 136 from a light source (not shown) is focused onto detector 138 after passing through masses 132 and 28 respectively. Detector 138 senses interference intensity between the beam portions created by masses 132 and 28. When it is subjected to acceleration, cantilever 36 is deflected and mass 28 tilts, and the interference in turn changes accordingly. Again, the measurement may be obtained by measuring an intensity value directly, or by tuning the phase difference through a spatial phase modulator and measuring a series of resulting interference intensity.

It is well-known that detector 138 may be a PN or PIN diode under reverse bias. The PN or PIN detector can be fabricated through conventional mature CMOS process along with the making of a MEMS device. In addition, signal amplification and control circuitry may be made on or above substrate 76 in the process. The integration of MOEMS device, photo detector, and circuitry makes the MOEMS system more robust and compact compared to the embodiment in FIGS. 11 and 12-A, where anther focus lens, a discrete detector, and external circuitry are required.

FIG. 14—Embodiments of MOEMS Pressure Sensor

FIG. 14 shows schematically a cross-sectional view of a transmission-type MOEMS pressure sensor. There are two cavities on a substrate 93. A sealed cavity 180 has a membrane 178, which moves up or down when there is a difference between the cavity and the ambient pressure. When displacement of membrane 178 occurs, a portion of incident collimated beam 128 will experience change of phase delay. On the other hand, another portion of beam 128 passes through the other cavity 184. Cavity 184 has an opening such that it always has the ambient pressure and its membrane will not be subjected to the external force as membrane 178.

Therefore, when beam 128 is focused after being transmitted through cavities 184 and 180 respectively, interference between the two portions can be used to measure the state of bending of membrane 178. Since cavity 180's pressure is known, ambient pressure can obtained. The two beam portions may be arranged to have a predetermined phase difference for measurement convenience, which may be done by depositing or etching a layer on the membrane of cavity 184. If a spatial phase modulator is used to tune phase difference between the two portions, the measurement resolution can be improved. In FIG. 14, an element 182 is employed to block light which passes through the wall between the cavities.

When a photo detector and control circuitry are added like the embodiment in FIG. 13, the scheme here becomes an integrated MOEMS pressure sensor.

FIGS. 15-A, 15-B, and 16-A to 16-C—Embodiments of MOEMS Accelerometer using Differrential Amplification As shown schematically in a cross-sectional view in FIG. 15-A, another embodiment of the invention involves two accelerometers which have similar structures. The accelerometers resemble the embodiment in FIG. 11. They have identical movable masses 206 and 208, identical cantilevers 204 and 210, but use different parts of a stationary mass 212. After collimated beam 128 passes through the accelerometers, two pairs of beam portions are generated—one by masses 206 and 212 and the other by masses 208 and 212. Next, the beam portions are focused and one pair is focused onto one detector and the other pair onto another detector (focus lenses and detectors not shown). Thus phase difference of each pair can be measured.

When being subjected to acceleration, movable masses 206 and 208 tilt by the same value due to identical parts. But since the pairs experience two parts of mass 212 separately, where the parts have different thickness, one pair's phase difference is always larger than the other pair's by a fixed number.

Assume interference intensity I follows formula $I=\cos^2(\psi/2)$, where psi is the phase difference of the two beams. The formula is illustrated by a curve of interference intensity vs. phase difference in FIG. 15-B. There are two middle points, marked by C and D, where the relative intensity is 0.5 at pi/2 and 3 pi/2. Around the middle point is the most linear region of the curve.

Arrange the masses such that points C and D represent the initial phase difference of the two pairs of beam portions. Thus initially the pairs have phase difference of pi/2 and 3pi/2 respectively. When there is acceleration, movable masses 206 and 208 tilt identically and cause the same phase change. Assume the phase change is beta. According to the interference intensity formula, intensity of one pairs becomes $\cos^2(pi/4+beta/2)$, while the other becomes $\cos^2(3 pi/4+beta/2)$. It is easy to show that the interference intensity is reduced by a value (sin(beta))/2 at point C for one pair, while increased by the same value at point D for the other pair.

Therefore, when the interference intensity of one beam portion pair at point D is subtracted by that of the other pair at point C, the result is twice the change. In other words, the two accelerometers may be utilized for differential amplification of signals and reduction of noise of the light source.

FIG. 16-A schematically shows a diagram of another embodiment of MOEMS accelerometer which may use differential amplification. Two accelerometers contain detectors 140 and 142 and movable masses 146 and 148, respectively. Between the detectors and movable masses is a lens system 144. FIG. 16-B illustrates schematically a configuration of a light source 150 and detectors 140 and 142 in a cross-sectional view. FIG. 16-C shows a schematic top view of movable masses 146 and 148 along with the cantilevers and stationary masses 143 and 145. Light source 150 emits a light beam which impinges onto the movable and stationary masses. A pair of beam portions is reflected by masses 143 and 146, while the other pair by masses 145 and 148.

Referring now to FIG. 16-A and 16-B, the detectors are arranged such that their light receiving areas (not shown) are close to each other and to a light emitting spot 152. As a consequence, when a beam from source 150 impinges onto the masses and is reflected back, it reaches the detectors. Furthermore, the detectors are arranged such that a pair of the beam portions reflected by masses 143 and 146 is transmitted to detector 140, and the other pair reflected by 145 and 148 is transmitted to detector 142. Thus, signals received by detectors 140 and 142 may be used for differential amplification.

FIGS. 17-A and 17-B—Embodiment of MOEMS Accelerometer Using Planar Waveguides FIG. 17-A schematically shows a top view of an embodiment of MOEMS accelerometer which employs planar waveguides to transmit a light beam. A beam from light source 118 is coupled into a single-mode waveguide channel 114. The beam passes through a Y-junction waveguide beam splitter 110 and a single-mode waveguide channel 108 and comes out from a waveguide end 120. The beam then impinges onto a movable mass 106 and a stationary mass 104 and is reflected back. Part of the reflected beam is coupled into waveguide channel 108, transmitted through splitter 110 and a single-mode waveguide channel 112, and finally to a detector 116.

Like mass 28 in FIG. 3-A, mass 106 is attached to a cantilever 102 and the cantilever to a fixed end 100. A cross-sectional view along line AA' is schematically depicted in FIG. 17-B, where it can be seen the structure is disposed on a substrate 126. The reflected beam contains two beam portions bounced back by mass 106 and 104 respectively. The accelerometer has principles the same as the embodiment in FIG. 3-A. It detects acceleration in a direction parallel to channel 108 in the waveguide plane.

Waveguide end 120 is preferred to have anti-reflection features to reduce noise and optical power loss. End 120 may be coated with anti-reflection coating for such purpose, or it may be fabricated to have an angled surface, where the surface normal has an angle with respect to the direction of beam propagation. An angled end surface reflects a beam in a direction such that the reflected beam is a leaky wave in the waveguide.

FIGS. 18 to 21—Embodiments of MOEMS Accelerometer Using Planar Waveguide

FIG. 18 shows schematically a top view of an embodiment of MOEMS accelerometer using planar waveguide and differential measurement. Like the one in FIG. 17-A, all the waveguides used here are of single mode. A light source 165 emits a beam which is coupled into a waveguide channel 168. The beam is split by a Y-junction beam splitter 173 into two beams. Then the two beams respectively pass through Y-junction splitters 171 and 172, enter waveguide channels 162 and 164, and are reflected by two accelerometer sub-structures. The sub-structures contain a shared stationary mass 174, cantilevers 154 and 160, and movable masses 156 and 158.

A beam from channel 162 is reflected by masses 156 and 174. Part of the reflected beam is coupled back into channel 162. The reflected beam then passes through splitter 171, enters a waveguide channel 166, and reaches a detector 161. Similarly, part of a beam reflected by masses 174 and 158 passes through channels 164 and 170 and reaches a detector 163. The signals received by detectors 161 and 163 may be used for differential amplification.

Figure 19:
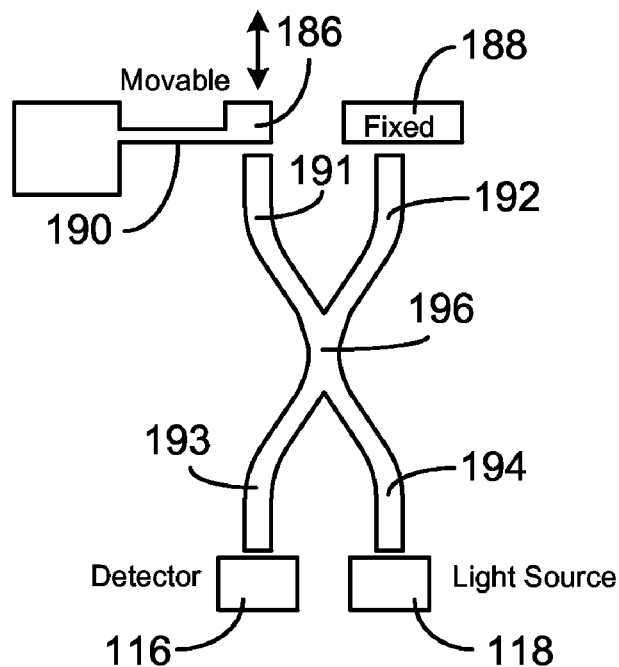

FIG. 19 illustrates schematically a top view of yet another MOEMS accelerometer embodiment using planar waveguide, which contains a cantilever 190, a movable mass 186, and a stationary mass 188. In contrast to the setup in FIG. 17-A, masses 186 and 188 are separated by a much larger distance and a 2×2 waveguide beam splitter 196 is employed. Because of splitter 196, a beam from light source 118 is split into two beams after traveling along a waveguide channel 194. The two beams are transmitted through waveguide channels 191 and 192 and reflected by masses 186 and 188 respectively. The two reflected beams enter channels 191 and 192 and are combined by splitter 196. Part of the combined beam is transmitted to a waveguide channel 193 and sensed by detector 116. Compared to the setup in FIG. 17-A, the scheme here is more flexible in terms of fabricating the movable and fixed masses, though at a cost of a larger footprint and it needs extra effort to match the two optical paths.

Figure 20:
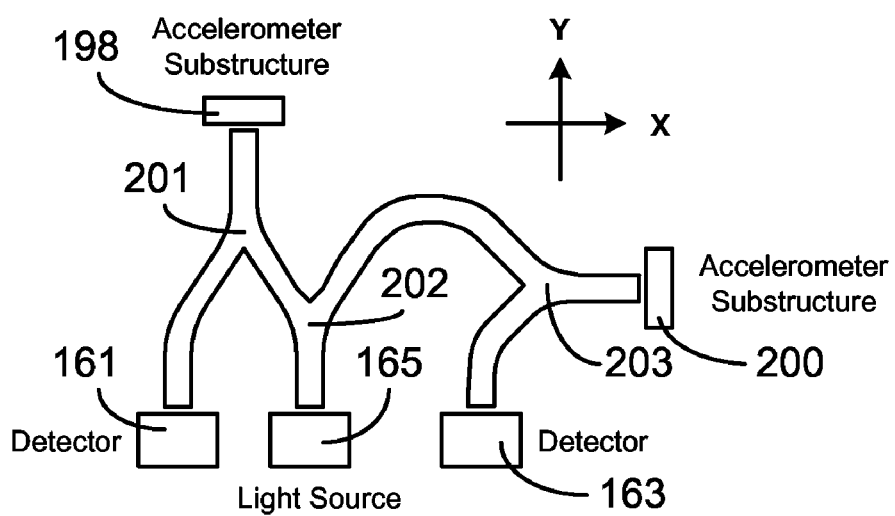

As shown in a schematic top view in FIG. 20, another MOEMS accelerometer embodiment makes use of the schemes in FIG. 17-A and combines two accelerometers so that it can sense acceleration in two dimensions. A Y-junction splitter 202 splits a beam from light source 165 into two beams. One beam passes through a Y-junction splitter 201 and heads for an accelerometer substructure 198, while the other beam goes through a Y-junction splitter 203 and impinges onto the other accelerometer substructure 200. The accelerometer sub-structure contains a movable mass, a cantilever, and a stationary mass as that in FIG. 17-A. Like the embodiments discussed before, substructure 198 reflects a beam back to the waveguide, and the reflected beam is partially transmitted to a detector 161 and provides data for acceleration in the Y direction. Meanwhile, a detector 163 measures acceleration in the X direction.

Figure 21:
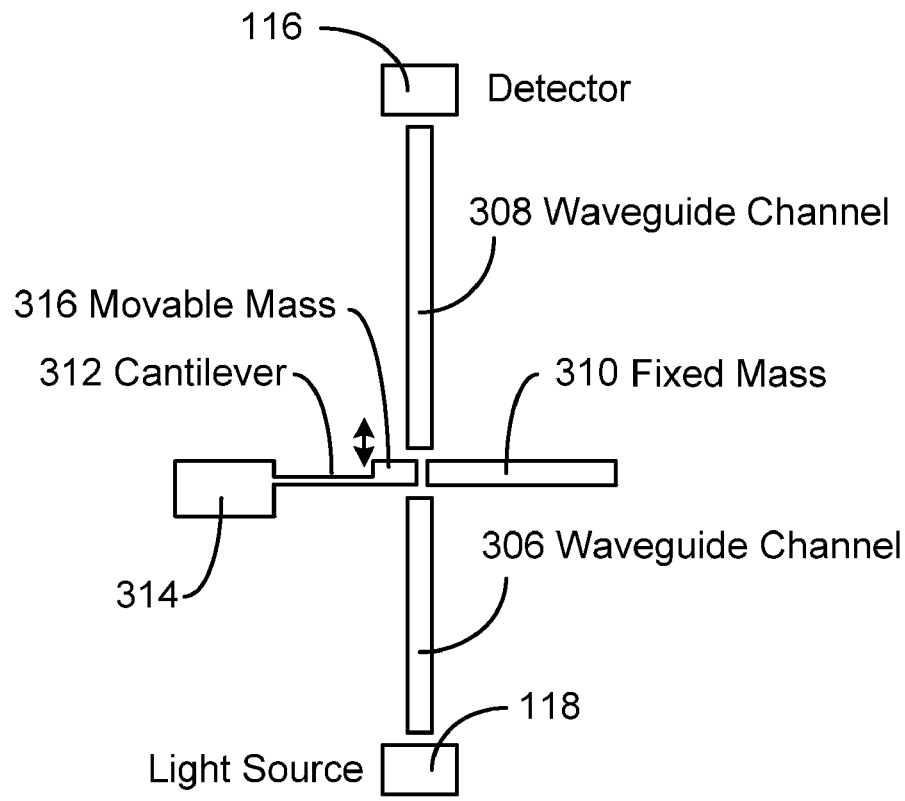

With reference to a schematic top view in FIG. 21, yet another embodiment of waveguide MOEMS accelerometer employs transmission, instead of reflection as in above discussions, to detect movement of a movable mass. A beam from light source 118 is coupled into a waveguide channel 306. The beam is then transmitted by the channel to impinge onto a movable mass 316 and a stationary mass 310, which are arranged between channel 306 and the other waveguide channel 308. After passing through masses 316 and 310, the beam is coupled into channel 308 and heads for detector 116. When mass 316 is subjected to acceleration, a cantilever 312, having a fixed end 314, is bent and mass 316 tilts. As in FIGS. 11 and 12-A, tilting of mass 316 results in change of the optical path length for a passing beam portion and interference is used to measure the acceleration.

Figure 22:
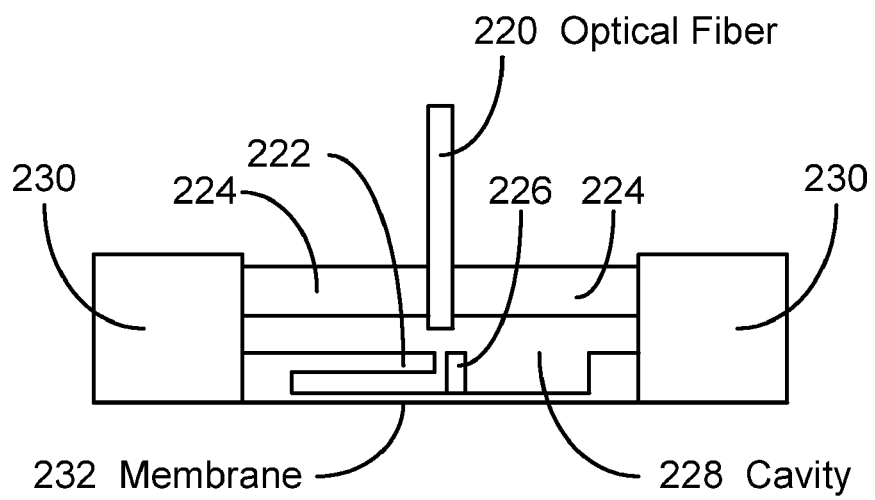
FIG. 22 is a schematic cross-sectional view of a MOEMS pressure sensor for fluids.

FIG. 22—Embodiment of MOEMS Pressure Sensor

FIG. 22 illustrates schematically a cross-sectional view of a MOEMS sensor for pressure measurements of fluid. An optical fiber 220 is connected to a light source and a detector (not shown). Fiber 220 may be replaced by a planar waveguide or an assembly of closed disposed light source and detector like the one shown before, where a light emitting spot is proximate to a light receiving area. A cavity 228 is enclosed by a membrane 232 and two ring-shaped cavity elements 224 and 230. Inside cavity 228, there are a stationary mass 222 and a movable mass 226 which is disposed on membrane 232 and moves with it.

The embodiment in FIG. 22 has the same principles as a reflection-type MOEMS pressure sensor or accelerometer. When a beam impinges onto masses 222 and 226, the reflection creates two beam portions. The beam portions are partially coupled back into fiber 220 and transmitted to the detector. Interference intensity between the beam portions is dependable upon height difference between masses 222 and 226. Any pressure change outside of membrane 232 causes displacement of the membrane. As a result, pressure can be measured by an optical interference method. Having a smooth membrane surface outside, the scheme may be used to measure pressure caused by fluid flow. To reduce influence on mass 222 by acceleration, mass 222 may be made thicker or to be connected to element 224.

CONCLUSION, RAMIFICATIONS, AND SCOPE

Thus it can be seen that I have used a light source, a detector, a stationary mass, and a movable mass to provide a MOEMS accelerometer and a MOEMS pressure sensor.

The MOEMS accelerometer and MOEMS pressure sensor have the following advantages:

The ability to obtain acceleration or pressure measurements at high-sensitivity and high-resolution by optical interferometric methods.

The optical interferometric structure which is relatively simpler and easier to fabricate than the current ones.

Although the description above contains many specificities, these should not be construed as limiting the scope of the invention but as merely providing illustrations of some of the presently preferred embodiments. Numerous modifications, alternations, and variations will be obvious to those skilled in the art.

For example, a gyro can be made by using several MOEMS accelerometers, since a gyro requires acceleration value along different directions at the same time.

For all schemes, an isolator may be added to reduce unwanted feedback to a light source.

Phase tuning mechanism may be added to channel 192 of the embodiment in FIG. 19 to control interference of the two returned beams. For example, the waveguide may be fabricated using electro-optical materials. And fixed mass 188 may be replaced by a flat reflective end of channel 192.

The two-dimensional accelerometer disclosed may be combined with another accelerometer for three-dimensional acceleration measurements.

The embodiment of two-dimensional acceleration measurement in FIG. 20 may be modified for use of differential amplification by employing schemes depicted in FIG. 18.

In FIG. 21, waveguide channels 306 and 308 may be replaced by two single-mode optical fibers.

In FIG. 22, while the movable and stationary masses remain the same, the cavity may be arranged to be on the other side of membrane 232. Compared with the embodiment in FIG. 10, the merit of using mass 222 is of closeness of the movable and stationary masses for a pressure sensor, which makes the device more compact.

Lastly, the accelerometer and pressure sensor schemes as discussed may be used to make vibration sensors and shock sensors. The same principles may also be used to measure gravity, radiation, temperature, electrostatic fields, magnetic fields, chemicals, or combinations.

Therefore the scope of the invention should be determined by the appended claims and their legal equivalents, rather than by the examples given.

What is claimed is:

1. A sensing device comprising:
   1) a first movable mass, said first movable mass including a first surface;
   2) a second movable mass including a second surface;
   3) a stationary mass including a stationary surface, said first, second, and stationary surfaces being disposed for receiving a first, second, and third portion of an incoming beam respectively, said first and second mass being arranged to phase shift said first and second portion respectively;
   4) a first interference sensor for detecting the displacement of said first mass relative to said stationary mass;
   5) a second interference sensor for detecting the displacement of said second mass relative to said stationary mass; and
   6) means for performing differential measurement based on the detected signals of said first and second interference sensors.

2. The device according to claim 1, further including a plurality of electrodes, at least one of said electrodes being attached to said first mass.

3. The device according to claim 1, further including a spatial phase modulator disposed in said beam for adjusting the phase of at least one of said first, second, and third portion.

4. The device according to claim 1 wherein said first sensor comprises a detector for receiving the detected signals, wherein said detector and said stationary mass are integrated.

5. The device according to claim 1, further including a light source for generating said incoming beam, said light source and a detector of said first sensor for receiving the detected signals being disposed in substantial proximity.

6. The device according to claim 1 wherein said first mass is attached to a movable membrane.

7. A method for measuring displacement by optical interference means, comprising:
   1) disposing a first movable mass and a stationary mass, said first mass comprising a plurality of opposite surfaces including a first and second surface;
   2) providing an incoming beam;
   3) transmitting a first part of said beam along an optical path inside said first mass through said first and second surface respectively, said first mass being arranged such that the displacement of said first mass relative to said stationary mass causes length change of said optical path; and
   4) detecting a first signal produced by the optical interference of said first part and a second part of said beam with a detector.

8. The method according to claim 7, further including disposing at least one waveguide and transmitting at least partially said beam by said waveguide.

9. The method according to claim 7, further including disposing a plurality of electrodes, at least one of said electrodes arranged on said first mass, and sensing electrical capacitance between said at least one electrode and another of said plurality of electrodes.

10. The method according to claim 7, further including integrating said detector and said stationary mass.

11. The method according to claim 7, further including adjusting the phase of at least one of the first and second part of said beam.

12. The method according to claim 7 wherein said first mass is attached to a movable membrane.

13. The method according to claim 7, further including:
1) disposing a second movable mass;
2) shifting the phase of a third part of said beam by said second mass;
3) detecting a second signal produced by the optical interference of said third part and a fourth part of said beam; and
4) using said first and second signals for differential measurements.

14. An interferometric optical sensing method comprising:
1) providing a first microfabricated movable mass comprising a surface;
2) providing an incoming beam and a first waveguide, said first waveguide being arranged in substantial proximity to said first mass;
3) impinging a first part of said beam on said surface via said first waveguide;
4) shifting the phase of said first part of said beam by said first mass;
5) receiving said first part of said beam by said first or a second waveguide, said first and second waveguide being separated from said first mass; and
6) measuring the interference of said first part and a second part of said beam, said first and second part of said beam being split by wavefront division means.

15. The method according to claim 14, further including disposing a plurality of electrodes, at least one of said electrodes arranged on said first mass, and sensing electrical capacitance between said at least one electrode and another of said plurality of electrodes.

16. The method according to claim 14, further including:
1) disposing a second movable mass;
2) shifting the phase of a third part of said beam by said second mass;
3) measuring the interference of said third part and a fourth part of said beam; and
4) using the measurements of interference for differential applications.

17. The method according to claim 14, further including adjusting the phase of at least one of the first and second part of said beam.

18. The method according to claim 14, further including:
1) disposing a second movable mass;
2) shifting the phase of a third part of said beam by said second mass; and
3) measuring the interference of said third part and a fourth part of said beam, said first and second mass being arranged for displacement measurements in a plurality of directions.

19. The method according to claim 14 wherein said first mass is attached to a movable membrane.

20. The method according to claim 14, further including integrating said first mass and said first waveguide.

* * * * *